(12) United States Patent
Rodriguez

(10) Patent No.: US 6,318,689 B1
(45) Date of Patent: Nov. 20, 2001

(54) CONTAINER HOLDER FOR REMOVABLY SECURING TO A MOUNTING SURFACE

(76) Inventor: Albert Rodriguez, 2020 NW. 107 Ave., Pembroke Pines, FL (US) 33026

(*) Notice: Subject to any disclaimer, the term of this patent is extended or adjusted under 35 U.S.C. 154(b) by 0 days.

(21) Appl. No.: 09/531,967

(22) Filed: Mar. 21, 2000

Related U.S. Application Data

(60) Provisional application No. 60/125,393, filed on Mar. 22, 1999.

(51) Int. Cl.[7] ........................................ A47K 1/08
(52) U.S. Cl. ............................ 248/311.2; 248/205.5
(58) Field of Search ...................... 248/311.2, 314, 248/205.5; 224/962

(56) References Cited

U.S. PATENT DOCUMENTS

| | | | |
|---|---|---|---|
| D. 353,045 | * 12/1994 | Chandler | D3/229 |
| D. 410,335 | * 6/1999 | Raich | D3/315 |
| D. 419,392 | * 1/2000 | Schlebusch | D7/619 |
| 5,407,110 | * 4/1995 | Marsh, Jr. | 224/148 |
| 6,098,860 | * 8/2000 | Phillips | 224/926 X |
| 6,145,715 | * 11/2000 | Slonim | 224/926 X |

* cited by examiner

Primary Examiner—Ramon O. Ramirez
(74) Attorney, Agent, or Firm—Frank L. Kubler

(57) ABSTRACT

A container holder for securing to a mounting surface and for receiving and retaining a container includes an elongate lash member having first lash member end and a second lash member end; a first lash member attachment mechanism secured to the first lash member end; a second lash member attachment mechanism secured to the second lash member end; and a container receiving pouch structure suspended substantially vertically from the horizontal elastic retaining lash. The lash member preferably is formed of elastic material, so that the lash member can be stretched to fit around and resiliently engage containers of various sizes, and to pull the container against the mounting surface, enhancing container support by increasing friction between the mounting surface and the container.

12 Claims, 9 Drawing Sheets

CONTAINER HOLDER FOR REMOVABLY SECURING TO A MOUNTING SURFACE

This application is based upon and continues from Provisional Application number 60/125,393, filed on Mar. 22, 1999.

BACKGROUND OF THE INVENTION

1. Field of the Invention

The present invention relates generally to the field of beverage vessel holding devices for securing to support structures, most commonly within vehicles such as boats. More specifically the present invention relates to a novel and improved beverage and container holder whose unique features permit it to hold containers of greater size and volume than is possible with other prior art devices.

This is accomplished in the preferred embodiment by using a unique design and construction comprising three separate holding and retention means, two of which can be used independently of the third, integrated into one assembly. The first means, an elastic retention lash member functions as an elastic retaining member to direct tension and friction against the container's outer wall, while simultaneously exerting an inward force, pulling the container against the surface on which said device is mounted, holding it there by tension and friction. The second holding means includes two suction cups and their integral necks, which when affixed to the ends of the first elastic retaining member, act as attachment means for securing the device to the mounting surface. When adjusted and placed the proper distance laterally and adjacent to one another, these suction cups and their corresponding necks act as "bumpers", contacting with and securing the container from any side to side movement in conjunction with the elastic retention lash. The third holding means employs an expandable elastic pouch structure suspended vertically from the horizontal elastic retaining lash, and parallel to the mounting surface. This elastic pouch structure includes several flexible elastic or webbing straps which contact the side walls of the object being held, expanding and conforming to its shape, thereby ensuring a snug fit. Furthermore, these lengths of webbing are bound together at a is central point forming the base of the pouch structure for contacting the underside wall of the container being held and supporting its weight.

When utilized together these retention and support means combine to form an expandable and adjustable holding apparatus with greatly increased storage capacity. In fact, the beverage and container holder opening actually enlarges to a configuration which provides more storage volume than the original holder dimensions would indicate to be possible. For instance, a typical beverage having a circular opening 3" in diameter by 3.25" deep contains a storage volume of 23 cubic inches within its structural confines (3.14×2.25×3.25). Variable geometry holders with adjustable arms or other means may approach 32 cu. in. storage volume within their structural confines (3.14×3.06×3.25). One embodiment of the present invention, by way of example only, can expandably increase this storage volume capacity to over 62 cu. in. (3.14×4×5), or a gain of 95% over other prior art devices; enough to securely hold large sized containers such as those commonly referred to as "two liter" bottles.

2. Description of the Prior Art

There have long been various arrangements for holding beverage containers such as bottles, cans, cups, etc. to any of a variety of support structures, each of which has met with varying degrees of success. Most beverage holders are made of rigid materials such as plastic or metal and are available in only black, white, or chrome colors. These beverage holders employ various container holding means such as support arms, rings, brackets, or circumferential enclosures of plastic or metal wire. All include some type of container base support structure on which the weight of the container is supported.

Many of these devices require complex molding, tooling, and assembly operations, which add to their complexity and manufacturing expense. In addition these devices are limited to installations on horizontal or vertical planar mounting surfaces with no provision for mounting on surfaces that may extend at an angle other than vertical or which may be rounded in shape, or otherwise deviate from flat planar forms. These installations require tools, hardware, screws, or adhesives, which results in a permanent fixture, which scars and otherwise clutters the mounting surface. Many of these devices tend to be fragile and are prone to crushing, breaking, or malfunction if they are inadvertently jarred or bumped by occupants of a vehicle such as a boat in which it is mounted. In the event that such holders are accidentally used as a perch or step or grabbed suddenly in an effort to stabilize the occupant of a moving vehicle such as a boat, they are often torn off their mounting surface or else become broken, cracked, or otherwise disfigured. There also exists a tendency for ropes or fishing lines to snag on the holder, or become fouled or entangled therewith.

Other drawbacks of prior art include but are not limited to structures which hold only the most popular types of drinking containers, namely those of cylindrical shape such as cans or bottles, or those with tapered cylindrical shapes such as drinking cups. Square or rectangular shaped drink cartons or boxes, as well as oval or any other odd shaped condiment or beverage containers may not fit securely within these devices and may spill or topple if jolted. Many of these devices make no provision for accommodating containers of varying diameters, even if they are of the most common cylindrical shapes as listed above. In the event that this problem is addressed, the result is a limited adjustment resulting in a loose or sloppy fit, as the openings of the holder are made to receive only the largest of one or two sizes of containers. Such installations are somewhat less than satisfactory for containers with diameters smaller than these openings, as once again, they tend to shift position in the holder, resulting in spillage from bumps experienced by the vehicle or the keeling of a boat.

Some examples of prior art container holders are set forth in the following references which are believed to have only a general relevance: Iwasaki, U.S. Pat. No. 4,915,337, issued on Apr. 10, 1990 for a flexible cup holder; Koorey, et al., U.S. Pat. No. 5,328,143, issued on Jul. 12, 1994 for a beverage container holding apparatus with promotional display; Koorey et al., U.S. Pat. No. Des. 337,028, issued on Jul. 6, 1993 for a beverage container holder; Douglas, et al., U.S. Pat. No. 5,139,222, issued on Aug. 18, 1992 for a beverage container holding apparatus; Douglas, et al., U.S. Pat. No. 5,328,143, issued on Jul. 12, 1994 for a beverage container holding apparatus with promotional display; Jones, et al., U.S. Pat. No. 5,149,032, issued on Sep. 22, 1992 for a universal cup holder for use in vehicles; McConnell, U.S. Pat. No. 4,828,211, issued on May 9, 1989 for a foldable support for beverage container; and Beckerer, Jr., U.S. Pat. No. 4,508,303, issued on Apr. 2, 1985 for a holder for containers.

It is thus an object of the present invention to provide an improved beverage and container holder which can be mounted to virtually any mounting surface which is clean, smooth, untextured and preferably nonporous, that extends at an angle that varies from vertical, or which may be rounded in shape or otherwise deviate from flat planar forms, whether the mounting surface is part of an automobile, a boat or stationary structure.

It is another object of the present invention to provide such a container holder which can securely retain containers of various shapes, such as cylindrical containers with circular, square, rectangular, oval, or any other shape bases.

It is still another object of the present invention to provide such a container holder which has a structural containment volume which is expandable to hold containers of various sizes, which uses a flexible elastic retaining lash member to forcibly exact tension and pressure on a container being held, frictionally securing it against a vertical mounting surface, the flexible elastic retaining lash engaging and conforming itself around circular, square, rectangular, oval, or any other odd-shaped container side wall, and holds it securely against its mounting surface, and which uses an elastic, expandable pouch structure to receive, engage and conform itself around the sides and bottom of the container or object being held.

It is a yet another object of the present invention to provide such a container holder which uses a combination of tension, friction, and pressure between its various structures, attachment means, and mounting surface to secure an object such as container and hold it securely in an upright fashion, and which integrates its attachment means and mounting surface to actively impart stability to the container or other object being held.

Further objects of the invention are to provide such a container holder which functions independently as a drink vessel lash by sole use of its elastic retaining member and attachment means, or in conjunction with its pouch structure as a drink lash/beverage container holder; which holds common beverage cups, bottles, and cans of varying outside diameters, securely and without spillage; which is adapted to hold varyingly sized and shaped containers and which fully adjusts itself to accommodate shapes other than circular cylindrical, which holds various types of beverage containers and is readily attached or removed without tools or hardware, and when removed, leaves the mounting surface in its original state, undamaged, and free from clutter; which holds various types of beverage containers; which uses its mounting means and mounting surface, in conjunction with one another, to stabilize the beverage container in an upright position, securely and without spillage, after a force has been imparted to the container holder, which holds various types of beverage containers; which is manufactured of soft, flexible, and resilient materials which is impervious to damage caused by bumping, jarring, etc., and when removed from its mounting surface can be crumpled or folded and stored in one's pocket which yields rather than tears in the event that someone attempts to use the device as a perch or step, thus indicating immediately to the person that the holder will not support any substantial weight and should not be used as a step and which is made of buoyant materials to float if dropped from a boat.

A still a further object of the present invention is to provide such a container holder which is so designed to reduce the possibility of ropes or lines becoming entangled thereon.

It is finally an object of the present invention to provide such a container holder which is simple in construction which is formed primarily of flexible, resilient and elastic textiles to be collapsible when not in use; which is attractive and manufactured in a variety of colors and which is economical to manufacture.

SUMMARY OF THE INVENTION

The present invention accomplishes the above-stated objectives, as well as others, as may be determined by a fair reading and interpretation of the entire specification.

A container holder is provided for securing to a mounting surface and for receiving and retaining a container, including an elongate lash member having first lash member end and a second lash member end; a first lash member attachment mechanism secured to the first lash member end; a second lash member attachment mechanism secured to the second lash member end; and a container receiving pouch structure suspended substantially vertically from the horizontal elastic retaining lash.

The lash member preferably is formed of elastic material, so that the lash member can be stretched to fit around and resiliently engage containers of various sizes, and to pull the container against the mounting surface, enhancing container support by increasing friction between the mounting surface and the container. The pouch structure preferably is formed of elastic material, so that the pouch structure is stretchable to fit around and resiliently engage containers of various sizes.

The lash member attachment mechanism preferably includes a first suction cup having a suction cup mounting structure affixed to the first lash member end, for pressing against and thereby engaging the mounting surface; and a second suction cup having a suction cup mounting structure affixed to the second lash member end, for pressing against and thereby engaging the mounting surface; so that the first and second suction cups are securable to the mounting surface a distance apart from each other corresponding generally to the width of a container to be placed within the pouch structure. The container holder preferably additionally includes a pull tab member secured to and extending outwardly from the lash member, for gripping between user fingers to stretch the lash member so that a container may be inserted through the lash member into the pouch structure.

The pouch structure preferably includes several flexible elastic pouch straps for snugly contacting, retaining and supporting the weight of a container while conforming to the shape of the container, each elastic pouch strap having two strap ends, at least one of the strap ends being secured to the lash member. For one embodiment the several flexible straps include a first pouch strap having a first pouch strap middle portion and two first pouch strap ends, where one first pouch strap end is secured to the lash member and the other first pouch strap end is secured to the lash member, the first pouch strap extending substantially parallel to the mounting surface; and a second pouch strap having upper and lower second pouch strap ends, where the upper second pouch strap end is secured to the lash member opposite the mounting surface and the lower second pouch strap end is secured to the first pouch strap middle portion. The upper second pouch strap end preferably includes a pull tab member extending outwardly from the lash member, for gripping between user fingers to stretch the lash member so that a container may be inserted through the lash member into the pouch structure.

For a second embodiment the several flexible straps include a first pouch strap having a first pouch strap middle portion and having two first pouch strap ends, where one first pouch strap end is secured to the lash member and the other first pouch strap end is secured to the lash member; and a second pouch strap having a second pouch strap middle portion and having two second pouch strap ends, where one second pouch strap end is secured to the lash member and the other second pouch strap end is secured to the lash member; so that the first pouch strap middle portion and the second pouch strap portion cross each other to define a pouch structure lower wall.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
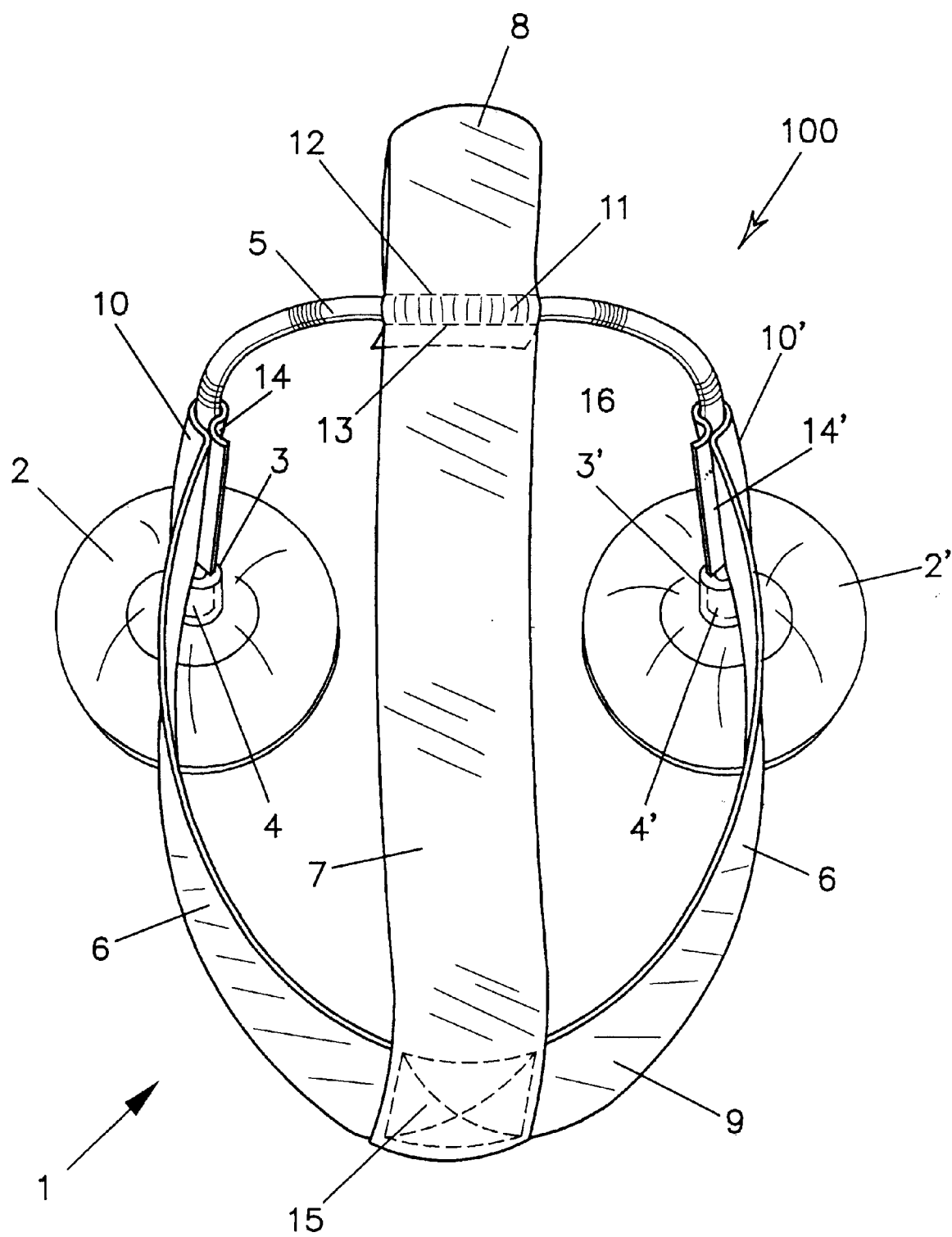
FIG. 1 is a bottom perspective view of the first embodiment of the container holder.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

PREFERRED EMBODIMENTS

Referring to FIG. 1–9 generally, and specifically to FIG. 1, a container holder 100 is provided for use in automobiles, recreational vehicles (RV's), power boats, jet skits and other vehicles, as well as stationary objects. Container holder 100 has an expandable pouch structure 1 formed by elastic straps 6 and 7; a support base 9 formed by binding elastic pouch strap 6 and 7 at point 15, strap support loops 10, 10' and 11, an elastic retention lash member 5, an opening 16 formed by the inner circumferential wall of elastic retention lash member 5, attachment means 2 and 2' secured to each end of elastic retaining lash member 5, and a tab 8, integral to elastic pouch strap 7 located above and adjacent to elastic retention lash member 5.

Figure 2:
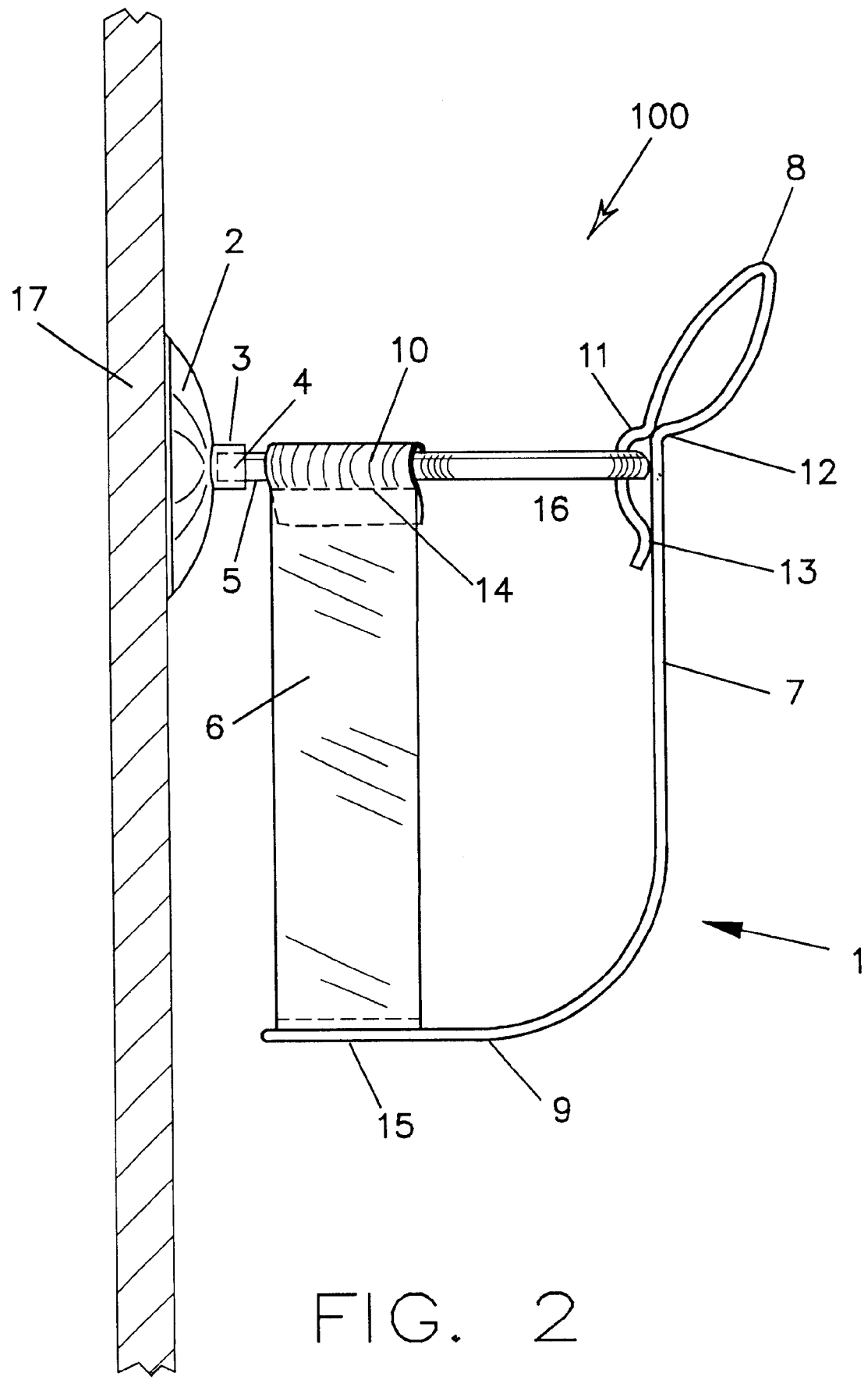
FIG. 2 is a side view of the container holder of FIG. 1 mounted to a mounting surface.

As illustrated in FIGS. 1 and 2, the beverage and container holder 100 extends horizontally from vertical mounting surface 17, and is secured by suction cups 2 and 2'. Each suction cup 2 and 2' is a single molded piece of vinyl and lash member 5 is preferably formed of latex rubber, so that a tight friction engagement is created as the latex tubing of the lash member 5 preferably fits over the vinyl suction cup neck 3,3'. See FIG. 9. Container holder 100 floats because of this preferred choice of buoyant materials: latex lash member tubing, polypropelene webbing, and a neoprene filled pull tab 8. Alternatively, and less preferred, suction cup necks 3 and 3' each contain a recess 4 and 4', respectively, used for receiving and thus securing elastic retaining lash member 5 to suction cups 2 and 2'. See FIGS. 1–8. Side support pouch straps 6 and 7, hang vertically from elastic retaining lash member 5 by support loops 10, 10', and 11, forming support base 9 when bound together at 15. Support loops 10 and 10' are formed by doubling over each end of support strap 10 and 10' and sewing seams 14 and 14'. Tab 8 and support loop 11 are formed by doubling over a length of support strap 7 and sewing seams 12 and 13 respectively. Opening 16 is a semi-circular opening formed between the inner circumferential wall of elastic retention lash 5 and the mounting surface 17.

Exemplary, specific strap arrangements are as follows. First pouch strap 6 is provided having a first pouch strap middle portion and two first pouch strap ends. One first pouch strap 6 end is secured to lash member 5 and the other first pouch strap 6 end is secured to the lash member 5, the first pouch strap extending substantially parallel to the mounting surface 7. See FIG. 1. Second pouch strap 7 has upper and lower second pouch strap 7 ends, where the upper second pouch strap 7 end is secured to the lash member 5 opposite the mounting surface and the lower second pouch strap 7 end secured to the first pouch strap 6 middle portion. For this embodiment, the upper pouch strap 7 end includes a pull tab member 8 extending outwardly from the lash member 5, for gripping between user fingers and stretching the lash member 5 so that a container 18 may be inserted through the lash member 5 into the pouch structure 1.

Figure 9:
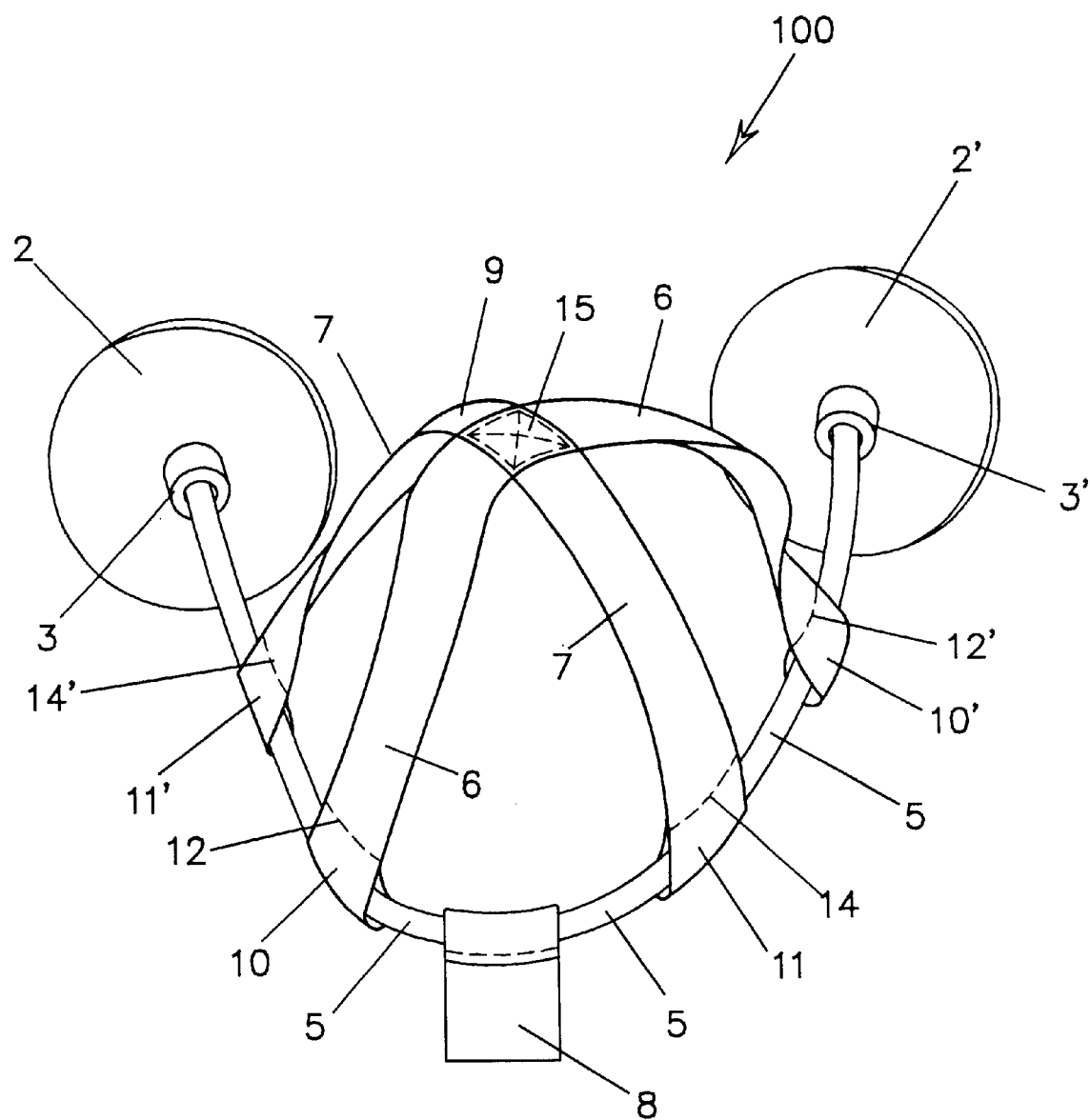
FIG. 9 is a bottom perspective view of the container holder of the second embodiment, having full length crossed pouch straps sewn together where they intersect at the bottom of the pouch structure.

The first preferred embodiment, which is shown in FIG. 9, reveals a pull tab 8 which is separate from the pouch straps. This preferred version of pull tab 8 is an outer pocket formed of flexible material containing neoprene. The lash member 5 passes through and thus is joined to one end of the pull tab 8 outer pocket. Alternatively, a segment of strap material wraps around lash member 5 and is sewn at both ends to opposing faces of the pull tab 8 outer pocket.

Another embodiment is provided in which first pouch strap 6 has a first pouch strap 6 middle portion and has two first pouch strap 6 ends, where one first pouch strap 6 end is secured to the lash member 5 and the other first pouch strap 6 end is secured to the lash member 5. See FIG. 9. A second pouch strap 7 has a second pouch strap middle portion and has two second pouch strap 7 ends, where one second pouch strap 7 end is secured to the lash member 5 and the other second pouch strap 7 end is secured to the lash member 5; so that the first strap 6 middle portion and the second pouch strap 6 middle portion cross each other to define essentially a pouch structure 1 bottom wall or support base 9.

Figure 3:
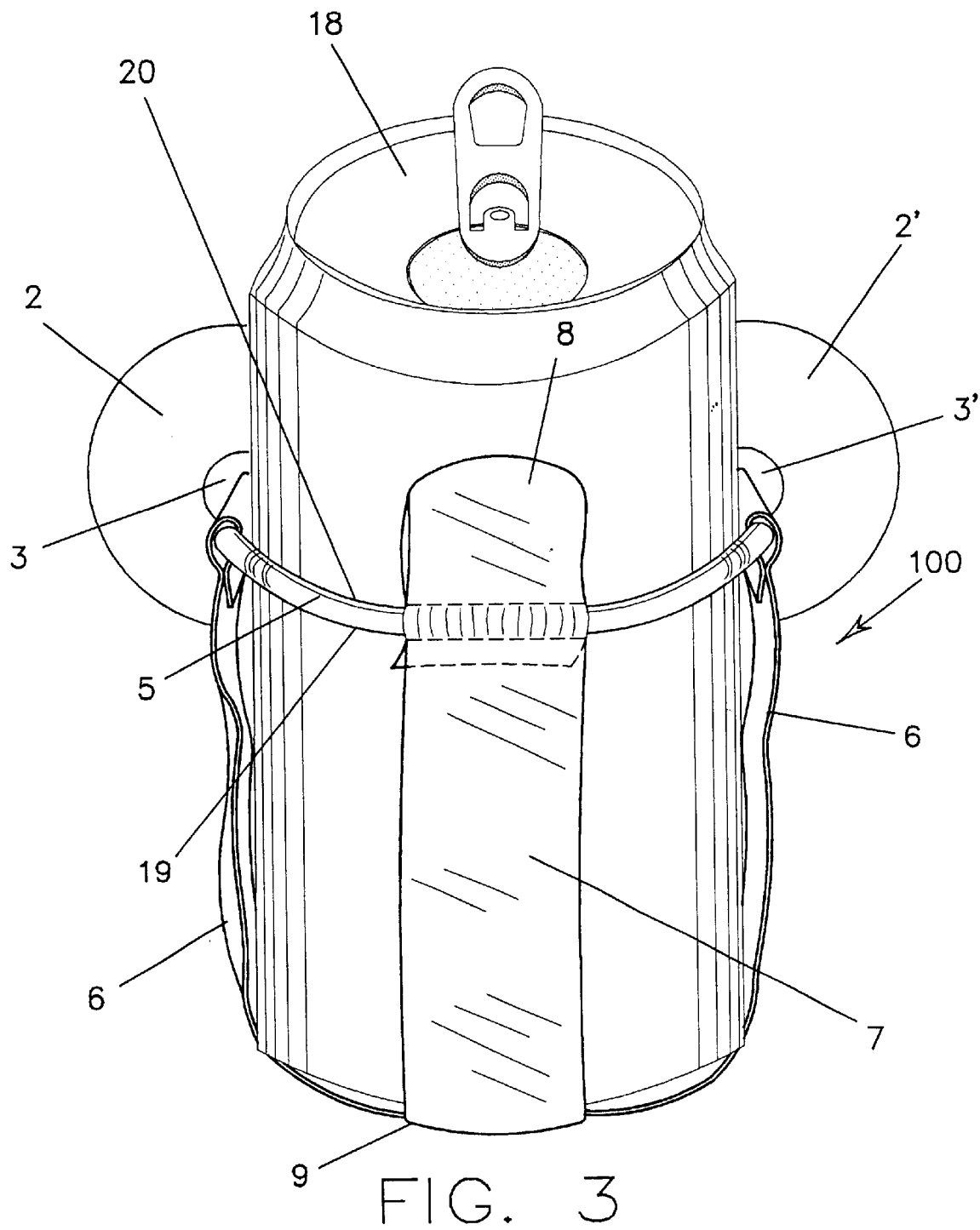
FIG. 3 is front perspective view of the holder of FIG. 1 shown retaining a container in the form of a beverage can.
Figure 4:
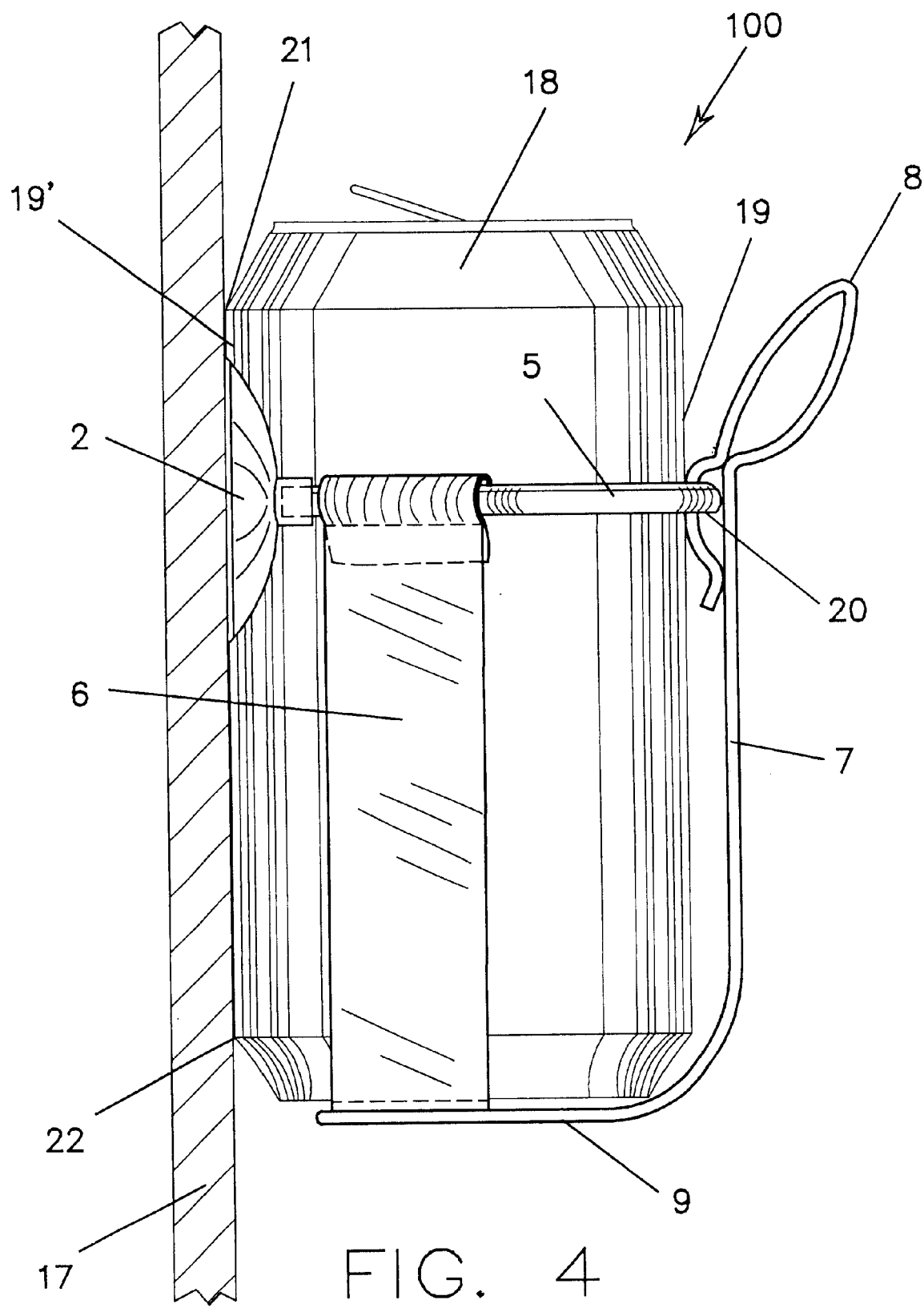
FIG. 4 is a view as in FIG. 2 showing the holder retaining a beverage can.

FIGS. 3 and 4 depict front and side views respectively, of a common beverage can 18 being held by one embodiment of the present invention. Suction cups 2 and 2' are attached to mounting surface 17 at an appropriate distance laterally and adjacent to one another to accommodate the width of the container being held, and impart a powerful suction against said mounting surface, holding the beverage and container holder securely in place. When tab member 8 is grasped and pulled horizontally outward and away from the mounting surface, it exacts an outward force on elastic retaining lash member 5, flexibly stretching it outward, enlarging opening 16 which is shown in FIGS. 1 and 2. When opening 16 is judged to be sufficiently large to accommodate the container to be held, the container 18 is introduced into the opening 16 in a downward fashion, its base and sides contacting elastic support straps 6 and 7, flexibly stretching them outward to accommodate its circumference. Containers 18 of sufficient size and weight will also flexibly stretch said elastic support straps in a downward fashion, perpendicular to the elastic retaining lash member 5, after contacting support base 9.

After container 18 is placed in the holder, tab member 8 is released, and elastic retaining lash member 5 recoils, exerting an inward force against the container's outer circumferential wall 19 by the elastic retaining lash's inside circumferential wall 20. This contraction of the elastic retaining lash member 5 forces the container's outer circumferential wall 19' to contact mounting surface 17 along a continuous line depicted between and including points 21 and 22.

Figure 5:
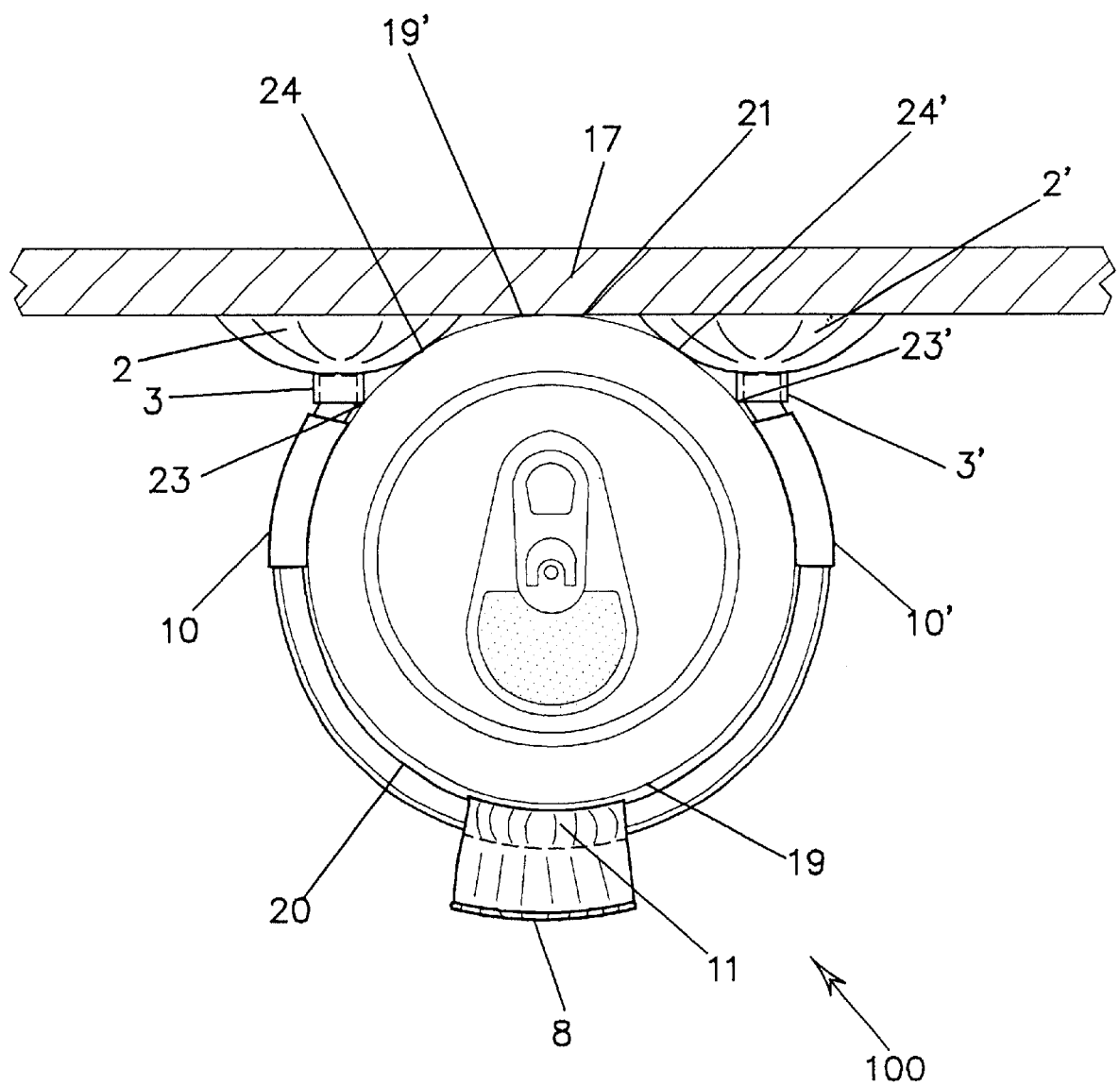
FIG. 5 is a top view of the container holder and retained beverage can of FIG. 4.

FIG. 5 also shows the container's area of contact at points 19' and 21. The container is held securely in an erect and fixed position relative to the mounting surface by means of inward tension along its outer circumferential wall 19, by the elastic retaining lash inner circumferential wall 20, and friction at mounting surface 17, along a continuous vertical line depicted in FIG. 4, between and including points 21 and 22.

Figure 6:
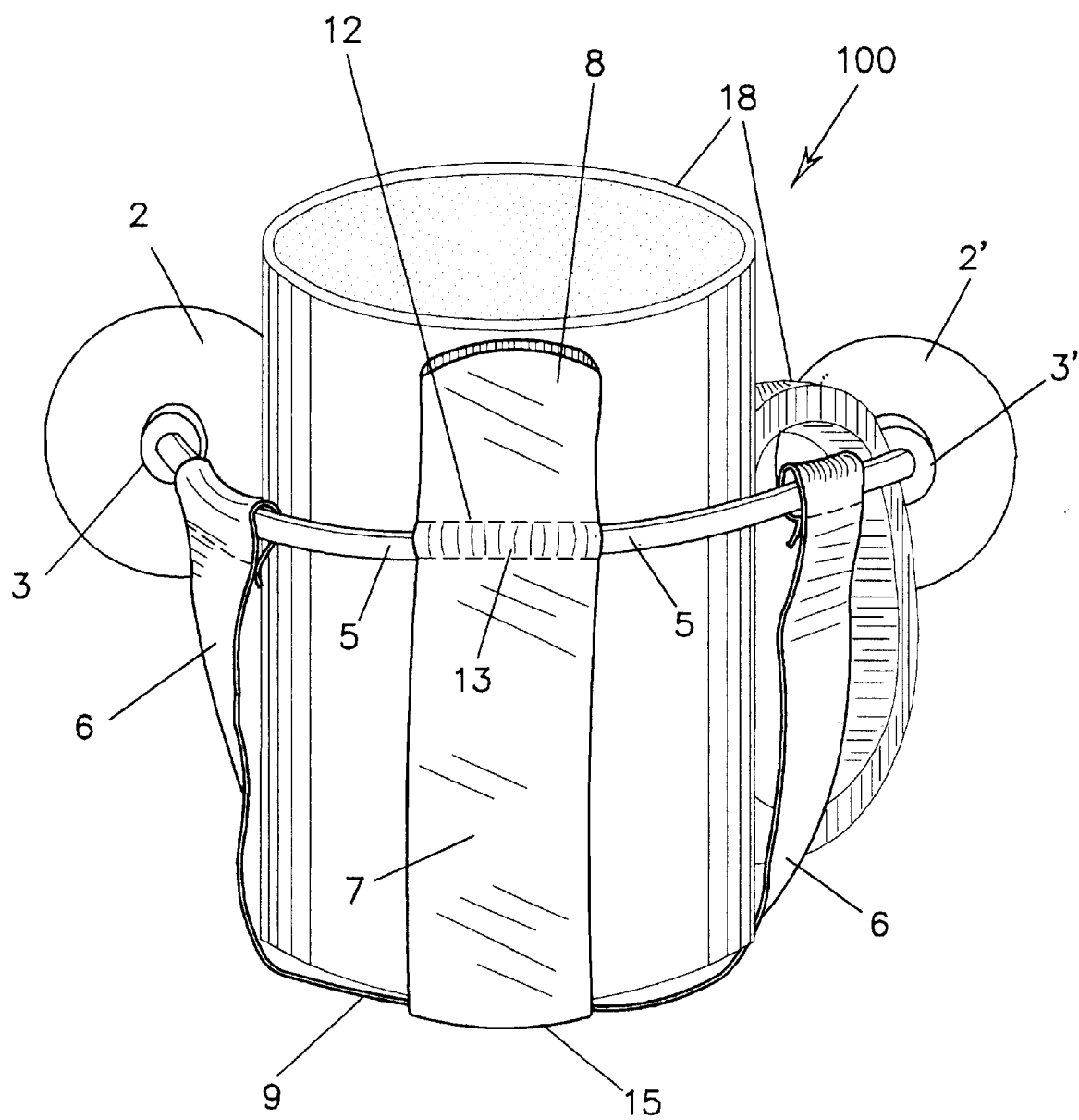
FIG. 6 is a front view of the container holder shown retaining a coffee mug.
Figure 7:
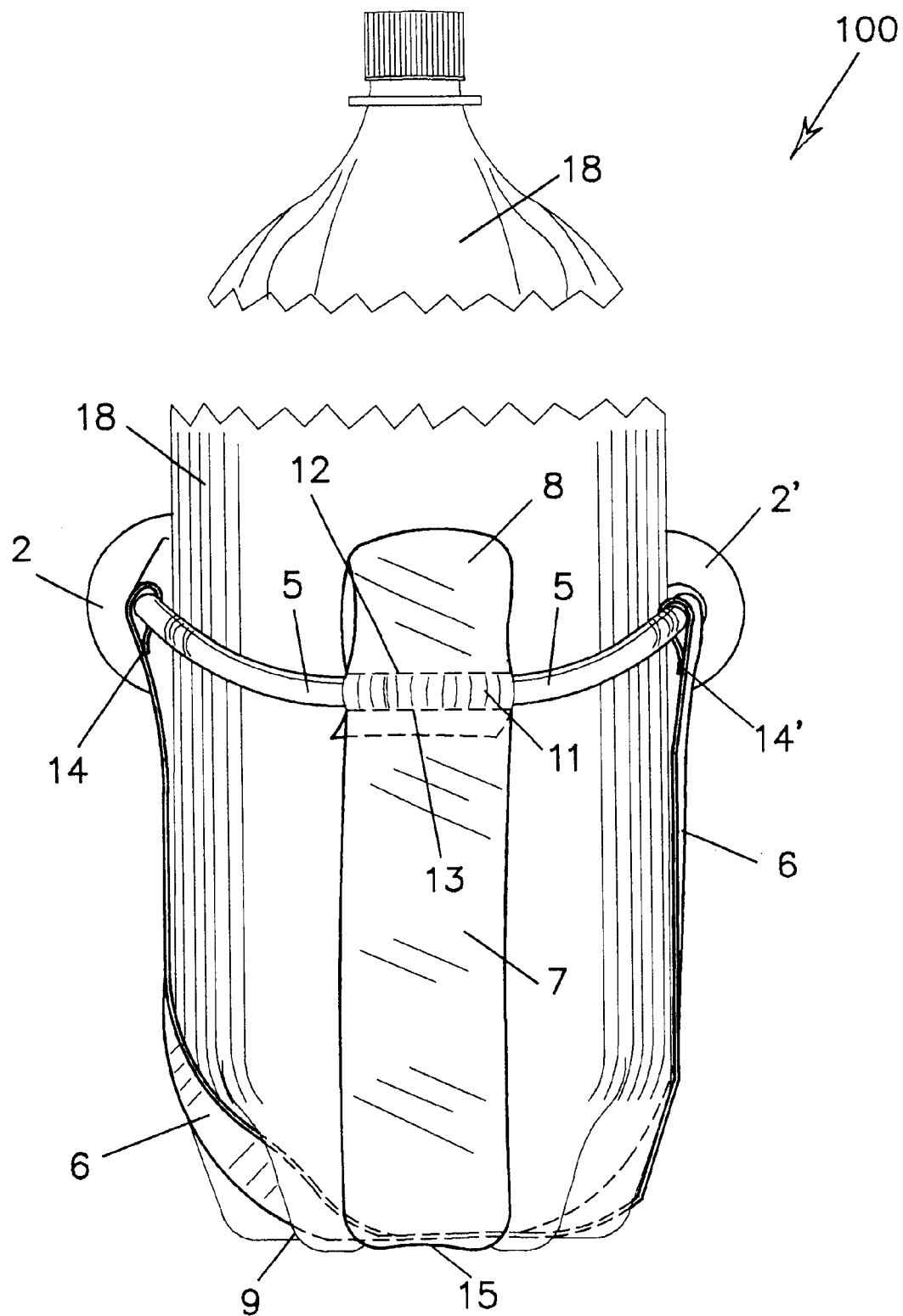
FIG. 7 a front view of the container holder of FIG. 1, expanded to retain a large bottle.
Figure 8:
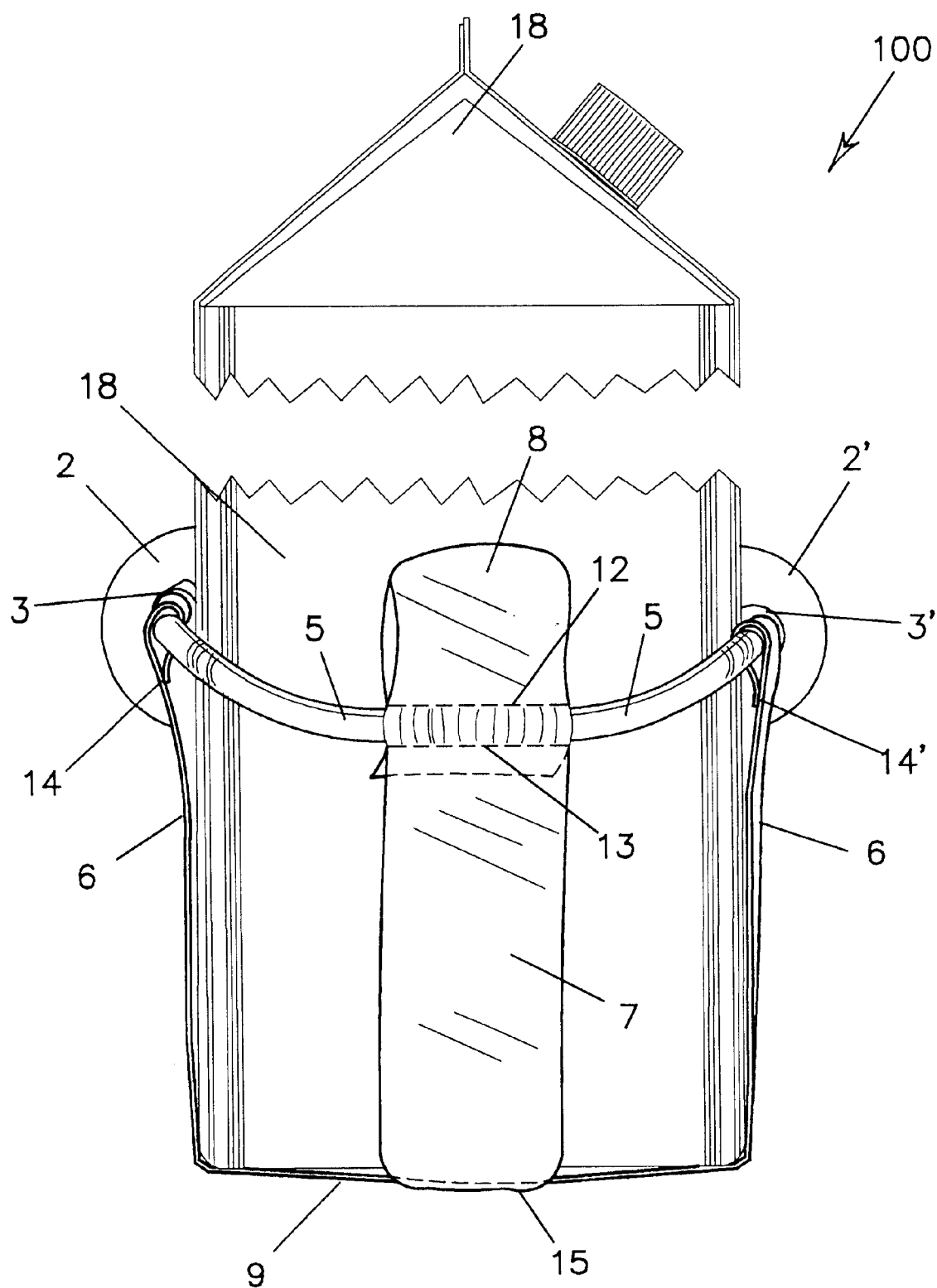
FIG. 8 is a front view of the container holder as in FIG. 7, once again expanded to retain an orange juice or milk carton.

As shown in FIGS. 3 and 5, container 18 is further stabilized by contact between its outer circumferential wall 19', suction cups 2 and 2', and necks 3 and 3' at points 23, 23' 24, and 24'. FIG. 6 depicts container holder 100 adjusted to hold coffee mugs or other containers 18 with handles. FIG. 7 shows container holder 100 adjusted to hold a "two liter" bottle or other over sized containers 18. It can be seen that the use of elastic components increases the adjustability of container holder 100, as well as its structural containment volume. FIG. 8 depicts container holder 100 adjusted to hold a rectangular drink carton with a square base.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A container holder for securing to a mounting surface and for receiving and retaining a container, comprising:
   an elongate lash member having first lash member end and a second lash member end;
   a first lash member attachment means secured to said first lash member end;
   a second lash member attachment means secured to said second lash member end;
   and a container receiving pouch structure suspended from said lash member.

2. The container holder of claim 1, wherein said lash member is formed of elastic material, such that the lash member can be stretched to fit around and resiliently engage containers of various sizes, and to pull the container against the mounting surface, enhancing container support by increasing friction between the mounting surface and the container.

3. The container holder of claim 1, wherein said pouch structure is formed of elastic material, such that said pouch structure is stretchable to fit around and resiliently engage containers of various sizes.

4. The container holder of claim 1, wherein said lash member attachment means comprise:
   a first suction cup having a suction cup mounting structure affixed to said first lash member end, for pressing against and thereby engaging the mounting surface;
   and a second suction cup having a suction cup mounting structure affixed to said second lash member end, for pressing against and thereby engaging the mounting surface;
   such that said first and second suction cups are securable to the mounting surface a distance apart from each other corresponding generally to the width of a container to be placed within the pouch structure.

5. The container holder of claim 1, additionally comprising a pull tab member secured to and extending outwardly from said lash member, for gripping between user fingers to stretch said lash member so that a container may be inserted through said lash member into said pouch structure.

6. The container holder of claim 1, wherein said pouch structure comprises:
   a plurality of flexible elastic pouch straps for snugly contacting, retaining and supporting the weight of a container while conforming to the shape of the container, each said elastic pouch strap having two strap ends, and at least one said strap end being secured to said lash member.

7. The container holder of claim 6, wherein said plurality of flexible straps comprise:
   a first pouch strap having a first pouch strap middle portion and two first pouch strap ends, wherein one said first pouch strap end is secured to said lash member and the other said first pouch strap end is secured to said lash member, said first pouch strap extending substantially parallel to the mounting surface;
   and a second pouch strap having upper and lower second pouch strap ends, wherein said upper second pouch strap end is secured to said lash member opposite the mounting surface and said lower second pouch strap end is secured to said first pouch strap middle portion.

8. The container holder of claim 7, wherein said upper second pouch strap end comprises a pull tab member extending outwardly from said lash member, for gripping between user fingers to stretch said lash member so that a container may be inserted through said lash member into said pouch structure.

9. The container holder of claim 6, wherein said plurality of flexible straps comprise:
   a first pouch strap having a first pouch strap middle portion and having two first pouch strap ends, wherein one said first pouch strap end is secured to said lash member and the other said first pouch strap end is secured to said lash member;
   and a second pouch strap having a second pouch strap middle portion and having two second pouch strap ends, wherein one said second pouch strap end is secured to said lash member and the other said second pouch strap end is secured to said lash member;
   such that said first pouch strap middle portion and said second pouch strap portion cross each other to define a pouch structure lower wall.

10. The container holder of claim 6, wherein said plurality of flexible straps are formed of substantially non-elastic material.

11. A container holder for securing to a mounting surface and for receiving and retaining a container, comprising:

an elongate lash member having first lash member end and a second lash member end;

a first lash member attachment means secured to said first lash member end;

a second lash member attachment means secured to said second lash member end;

and a container receiving pouch structure suspended from said lash member;

wherein said lash member is formed of elastic material, such that the lash member can be stretched to fit around and resiliently engage containers of various sizes, and to pull the container against the mounting surface, enhancing container support by increasing friction between the mounting surface and the container;

and wherein said pouch structure is formed of elastic material, such that said pouch structure is stretchable to fit around and resiliently engage containers of various sizes.

12. A container holder for securing to a mounting surface and for receiving and retaining a container, comprising:

an elongate lash member having first lash member end and a second lash member end;

a first lash member attachment means secured to said first lash member end;

a second lash member attachment means secured to said second lash member end;

and a container receiving pouch structure suspended from said lash member;

wherein said lash member attachment means comprise a first suction cup having a suction cup mounting structure affixed to said first lash member end, for pressing against and thereby engaging the mounting surface, and a second suction cup having a suction cup mounting structure affixed to said second lash member end, for pressing against and thereby engaging the mounting surface, such that said first and second suction cups are securable to the mounting surface a distance apart from each other corresponding generally to the width of a container to be placed within the pouch structure;

and wherein said pouch structure comprises a plurality of flexible elastic pouch straps for snugly contacting, retaining and supporting the weight of a container while conforming to the shape of the container, each said elastic pouch strap having two strap ends, and at least one said strap end being secured to said lash member.

* * * * *